(12) United States Patent
Goto et al.

(10) Patent No.: US 10,762,184 B2
(45) Date of Patent: Sep. 1, 2020

(54) AUTHENTICATION DEVICE AND AUTHENTICATION METHOD

(71) Applicant: TOYOTA JIDOSHA KABUSHIKI KAISHA, Toyota-shi, Aichi-ken (JP)

(72) Inventors: Yuya Goto, Toyota (JP); Yosuke Ohashi, Iwakura (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 186 days.

(21) Appl. No.: 15/996,954

(22) Filed: Jun. 4, 2018

(65) Prior Publication Data
US 2019/0018941 A1    Jan. 17, 2019

(30) Foreign Application Priority Data
Jul. 13, 2017 (JP) .................................. 2017-137304

(51) Int. Cl.
*G06F 21/00* (2013.01)
*G06F 21/32* (2013.01)
(Continued)

(52) U.S. Cl.
CPC .............. *G06F 21/32* (2013.01); *G06F 21/35* (2013.01); *G06F 21/40* (2013.01); *G06F 21/44* (2013.01); *H04W 12/06* (2013.01)

(58) Field of Classification Search
CPC ............ G07C 9/25–26; G07C 9/00563; B60R 25/25–257; G06F 21/32
See application file for complete search history.

(56) References Cited

U.S. PATENT DOCUMENTS 6,940,391 B1* 9/2005 Ishikura ............. G07C 9/00309
340/5.7
2003/0046540 A1* 3/2003 Nakamura ............. G07C 9/257
713/168
(Continued)

FOREIGN PATENT DOCUMENTS

EP          1643459 A2    4/2006
JP       2006-082691 A    3/2006
(Continued)

*Primary Examiner* — Trong H Nguyen
(74) *Attorney, Agent, or Firm* — Oliff PLC

(57) ABSTRACT

An authentication device that authenticates a user using person specifiable information includes a first storage unit configured to store person specifiable information specifying a registered user, a second storage unit configured to store association information in which the registered user is associated with a predetermined terminal possessed by the registered user, a first acquisition unit configured to acquire person specifiable information from an authentication target user, a second acquisition unit configured to acquire identification information, a user specifying unit configured to specify a user associated with the terminal transmitting the identification information based on the association information and the identification information, and an authentication processing unit configured to authenticate the authentication target user by executing a comparison process between the person specifiable information of the authentication target user and the person specifiable information of the registered user in an order that is set based on the specified user.

9 Claims, 5 Drawing Sheets

(51) Int. Cl.
*G06F 21/40* (2013.01)
*G06F 21/44* (2013.01)
*H04W 12/06* (2009.01)
*G06F 21/35* (2013.01)

(56) References Cited

U.S. PATENT DOCUMENTS

| | | | |
|---|---|---|---|
| 2006/0055509 A1* | 3/2006 | Teshima | B60R 25/252 340/5.53 |
| 2006/0097844 A1* | 5/2006 | Nakashima | B60R 25/25 340/5.52 |
| 2017/0048224 A1 | 2/2017 | Teraoka et al. | |
| 2017/0155629 A1* | 6/2017 | Gomi | H04L 63/062 |

FOREIGN PATENT DOCUMENTS

| | | |
|---|---|---|
| JP | 2006-131031 A | 5/2006 |
| JP | 2010-049694 A | 3/2010 |
| JP | 2014-153741 A | 8/2014 |

* cited by examiner

| REGISTERED USER | TERMINAL (IDENTIFICATION INFORMATION) |
|---|---|
| A | ta |
| B | tb |
| C | tc |
| ⋮ | ⋮ |

AUTHENTICATION DEVICE AND AUTHENTICATION METHOD

INCORPORATION BY REFERENCE

The disclosure of Japanese Patent Application No. 2017-137304 filed on Jul. 13, 2017 including the specification, drawings and abstract is incorporated herein by reference in its entirety.

BACKGROUND

1. Technical Field

The present disclosure relates to an authentication device that authenticates a user using person specifiable information, and an authentication method executed by the authentication device.

2. Description of Related Art

An authentication device disclosed in, for example, Japanese Unexamined Patent Application Publication No. 2010-049694 (JP 2010-049694 A), Japanese Unexamined Patent Application Publication No. 2006-082691 (JP 2006-082691 A) and Japanese Unexamined Patent Application Publication No. 2006-131031 (JP 2006-131031 A) determines whether or not a person is valid using biometric information (biological features of a person) that is one type of person specifiable information. The biometric information includes physical features based on physical appearance such as face, fingerprint, iris, and vein, and behavioral features based on behavioral characteristics such as voice and signature.

In the authentication device, the biometric information is read from a user who is an authentication target, and the read biometric information is compared with a plurality of pieces of biometric information preregistered in a memory and the like. The user who is an authentication target is authenticated as a registered user by determining whether or not the similarity between the read biometric information and any registered biometric information is higher than or equal to a threshold that is a reference for authenticating a valid person.

SUMMARY

In the authentication device in the related art, the biometric information of the user who is an authentication target is compared with each of the pieces of preregistered biometric information in a predetermined fixed order until the authentication of the user succeeds. Thus, depending on the order of comparison of the biometric information, it takes time until the authentication of the user who is an authentication target succeeds.

The present disclosure provides an authentication device and an authentication method that can further reduce the time taken until authentication of a user succeeds.

A first aspect of the disclosure relates to an authentication device that authenticates a user using person specifiable information. The authentication device includes a first storage unit configured to store person specifiable information specifying a registered user who is registered in advance, a second storage unit configured to store association information in which the registered user is associated with a predetermined terminal possessed by the registered user, a first acquisition unit configured to acquire person specifiable information from the authentication target user, a second acquisition unit configured to acquire identification information that is transmitted from the terminal present around the authentication device, a user specifying unit configured to specify a user associated with the terminal transmitting the identification information based on the association information and the identification information, and an authentication processing unit configured to authenticate the authentication target user by executing a comparison process between the person specifiable information of the authentication target user and the person specifiable information of the registered user stored in the first storage unit in an order that is set based on the user specified by the user specifying unit.

According to the first aspect of the disclosure, the association information in which the user using the device is associated with the terminal possessed by the user is stored in advance in the second storage unit. When there is a need for authenticating a certain user, and the device acquires the identification information that can specify the terminal, the user associated with the terminal is specified using the identification information and the stored association information, and the authentication process is performed in the order set based on the specified user.

By such a control, the comparison process for the person specifiable information is performed in a manner that is set based on the user possessing the terminal of which the identification information is acquired, and the probability of the authentication of the user as an authentication target succeeding promptly can be further increased. Accordingly, the time taken until the authentication of the user succeeds can be further reduced.

In the authentication device according to the first aspect of the disclosure, the authentication processing unit may be configured to authenticate the authentication target user by executing the comparison process between the person specifiable information of the authentication target user and the person specifiable information of the registered user stored in the first storage unit in an order that is set by prioritizing the user specified by the user specifying unit.

By such a control, the comparison process is prioritized for the person specifiable information of the user possessing the terminal of which the identification information is acquired, and the probability of the authentication of the user as an authentication target succeeding in the authentication process performed for the first time is further increased. Accordingly, the time taken until the authentication of the user succeeds can be further reduced.

In the authentication device according to the first aspect of the disclosure, the user specifying unit may be configured to rewrite the association information when a combination of the user successfully authenticated by the authentication processing unit and the terminal transmitting the identification information is different from a combination of the registered user and the terminal associated with each other in the association information. Accordingly, the time taken until the authentication of the user succeeds can be further reduced in response to a change in combination.

In the authentication device according to the first aspect of the disclosure, the user specifying unit may be configured to present a difference in combination to the user through a predetermined presentation device when a combination of the user successfully authenticated by the authentication processing unit and the terminal transmitting the identification information is different from a combination of the registered user and the terminal associated with each other in the association information. Accordingly, the user can be alerted.

In the authentication device according to the first aspect of the disclosure, the person specifiable information may include biometric information of at least one of face, fingerprint, iris, vein, voiceprint, retina, or deoxyribonucleic acid (DNA).

In the authentication device according to the first aspect of the disclosure, the authentication device may be mounted in a vehicle, and the predetermined terminal may be a portable device (an electronic key, a card key, or the like) that is used for operating the vehicle.

In the authentication device according to the first aspect of the disclosure, the person specifiable information of a user having a possibility of using the authentication device may be registered in the first storage unit, and the association information of a part of users having a high frequency of using the authentication device may be registered in the second storage unit.

In the authentication device according to the first aspect of the disclosure, all or a part of the first storage unit, the second storage unit, the first acquisition unit, the second acquisition unit, the user specifying unit, and the authentication processing unit may be configured with an electronic control unit.

A second aspect of the disclosure relates to an authentication method executed by an authentication device that authenticates a user using person specifiable information. The authentication device includes an electronic control unit that includes a storage unit configured to store person specifiable information specifying a registered user who is registered in advance and association information in which the registered user is associated with a predetermined terminal possessed by the registered user. The authentication method includes, by the electronic control unit using the person specifiable information and the association information stored in the storage unit, acquiring person specifiable information from an authentication target user, acquiring identification information that is transmitted from a terminal present around the authentication device, specifying a user associated with the terminal transmitting the identification information based on the association information and the identification information, and authenticating the authentication target user by executing a comparison process between the person specifiable information of the authentication target user and the person specifiable information of the registered user stored in the storage unit in an order that is set based on the specified user.

Each process performed by the authentication device may be perceived as an authentication method providing a series of process procedures. The authentication method is provided in the form of a program for causing a computer to execute the series or process procedures. The program may be introduced into the computer in the form of a recording on a computer-readable recording medium. A part or all of function blocks constituting the authentication device may be implemented as large-scale integration (LSI) that is an integrated circuit.

As described thus far, the authentication device and the authentication method according to the aspects of the disclosure can further reduce the time taken until the authentication of the user succeeds.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

The disclosure provides an authentication device and an authentication method for authenticating a user using person specifiable information. In the authentication device and the authentication method, information in which a user who uses the device is associated with a predetermined terminal possessed by the user is stored in advance. In authentication of a certain user, when identification information that can specify a terminal is acquired, a user who is associated with the terminal is specified using the identification information and the association information, and an authentication process for person specifiable information is performed in an order that prioritizes the specified user. Accordingly, the probability of authentication succeeding in the authentication process performed for the first time is further increased, and the time that is taken until the authentication of the user succeeds can be further reduced.

Configuration of Authentication Device

Figures 1, 2:
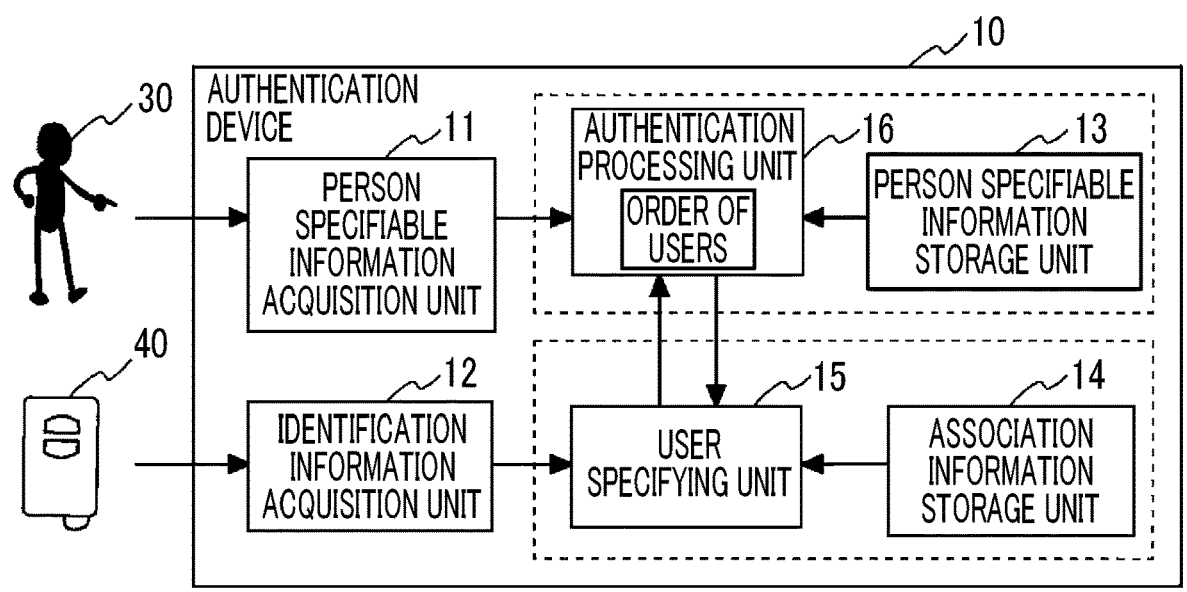
FIG. 1 is a diagram for describing a schematic configuration of an authentication device according to one embodiment of the disclosure.
FIG. 2 is a table illustrating one example of association information stored in an association information storage unit.

FIG. 1 is a diagram for describing a schematic configuration of an authentication device 10 according to one embodiment of the disclosure. The authentication device 10 according to the present embodiment illustrated in FIG. 1 includes a person specifiable information acquisition unit 11, an identification information acquisition unit 12, a person specifiable information storage unit 13, an association information storage unit 14, a user specifying unit 15, and an authentication processing unit 16.

FIG. 1 illustrates a situation where a user (hereinafter, referred to as an "authentication target user") 30 who requests the authentication device 10 to perform the authentication process is present around the authentication device 10 while carrying a terminal 40. Examples of the terminal 40 include a smartphone, a mobile phone, a tablet, and a portable device such as an electronic key and a card key.

In the present embodiment set forth below, the disclosure will be illustratively described in a case where the authentication device 10 is installed in a vehicle such as a passenger car and provides a service for operating the vehicle. The authentication device 10 according to the present embodiment can be installed in various places where the authentication process for a valid person is needed for providing a service such as permitting entry or exit from a predetermined area such as a building and a room, and permitting withdrawal or deposit of money at an automated teller machine (ATM) and the like.

The person specifiable information acquisition unit 11 (corresponds to a "first acquisition unit" in the aspects of the disclosure) can acquire the person specifiable information that can specify a person. More specifically, the person specifiable information acquisition unit 11 can acquire the person specifiable information (hereinafter, referred to as "input person specifiable information") that is input by the authentication target user 30 who uses the vehicle. The input person specifiable information can be input from one or a plurality of predetermined input devices (not illustrated) installed inside and outside the vehicle cabin. The person specifiable information includes biometric information such as face, fingerprint, vein in finger or hand, iris in eyeball, voiceprint, retina, and DNA of person, and setting information such as personal identification number and signature.

In the embodiment where the authentication device 10 is applied to the vehicle, for example, a camera sensor that is installed near a dashboard or an instrument panel of the vehicle and can acquire an image of the face of an occupant in the seat can be used as the input device. For example, a fingerprint sensor that is installed near a door handle of the vehicle and can detect a fingerprint can be used as the input device. Besides, a well-known device can be used as the input device. The input person specifiable information acquired by the person specifiable information acquisition unit 11 is output to the authentication processing unit 16.

The identification information acquisition unit 12 (corresponds to a "second acquisition unit" in the aspects of the disclosure) can acquire identification information that is transmitted from the terminal 40 present around the authentication device 10. The identification information may be unique information that can distinguish the terminal 40 from another terminal. The format or form of the information is not particularly limited. The identification information acquisition unit 12 may acquire the identification information from the terminal 40 either by wireless communication or by wired communication. The identification information acquisition unit 12 may request the terminal 40 to transmit the identification information or may wait until the identification information is transmitted from the terminal 40.

In the present embodiment, the terminal 40 corresponds to an electronic key or a card key assigned to the vehicle, and the identification information corresponds to a key identifier ID). In such a case, for example, a request signal for requesting provision of the key identifier is transmitted from the vehicle side toward the terminal 40 which is the electronic key. The terminal 40 receives the request signal from the vehicle and provides (transmits) the key identifier retained in the terminal 40 to the authentication device 10. The identification information acquired by the identification information acquisition unit 12 is output to the user specifying unit 15 after the terminal 40 is authenticated as a valid terminal (electronic key) by a predetermined comparison process.

The person specifiable information storage unit 13 (corresponds to a "first storage unit" in the aspects of the disclosure) can store the person specifiable information. More specifically, the person specifiable information (hereinafter, referred to as "registered person specifiable information") that can specify a registered user is stored in advance in the person specifiable information storage unit 13 per user (hereinafter, referred to as a "registered user") who is registered in advance for using the authentication device 10 (vehicle). The person specifiable information includes the biometric information such as face, fingerprint, vein, and iris, and the setting information such as personal identification number. At least one information in the person specifiable information is stored in association with the registered user. FIG. 2 illustrates one example of the registered person specifiable information stored in the person specifiable information storage unit 13. The registered person specifiable information may be stored in advance in the person specifiable information storage unit 13 through the person specifiable information acquisition unit 11 or, for example, may be stored in advance in the person specifiable information storage unit 13 from a configuration other than the person specifiable information acquisition unit 11 by data transmission from a smartphone. The registered person specifiable information can be freely added or removed from the person specifiable information storage unit 13.

The person specifiable information storage unit 13 may be configured as an independent memory device or the like, or may be configured as a module (illustrated by dotted line in FIG. 1) along with the authentication processing unit 16, described below, as a personal information authentication device.

Figures 3, 4:
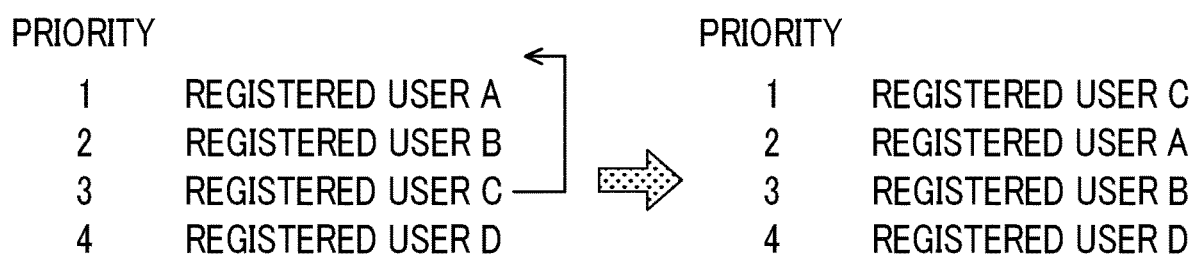
FIG. 3 is a table illustrating one example of registered person specifiable information stored in a person specifiable information storage unit.
FIG. 4 is a diagram for describing one example of a change in the order of registered users in a comparison process.

The association information storage unit 14 (corresponds to a "second storage unit" in the aspects of the disclosure) stores, in advance, the association information in which the registered user stored in the person specifiable information storage unit 13 is associated with a predetermined terminal. The association information is information in which a predetermined terminal possessed by the registered user is associated with the registered user per registered user. The predetermined terminal to be associated is not particularly limited and is preferably a terminal that has the longest history of being carried by the registered user. For example, the predetermined terminal is desirably one terminal, among a plurality of terminals possessed by the registered user, that is carried the largest number of times or carried for the longest cumulative time up to the present when the authentication device 10 (vehicle) is used. When such a terminal is associated with the user, the effect of the disclosure can be further achieved. FIG. 3 illustrates one example of the association information stored in the association information storage unit 14. The association information can be freely added or removed from the association information storage unit 14.

The association information storage unit 14 may be configured as an independent memory device or the like, or may be configured as a module (illustrated by dotted line in FIG. 1) along with the user specifying unit 15, described below, as a user specifying device.

The user associated with the terminal 40 that transmits the identification information is specified by the user specifying unit 15 based on the association information stored in the association information storage unit 14 and the identification information acquired from the terminal 40 by the identification information acquisition unit 12. For example, when a terminal "ta" as a source of transmission is specified from the identification information, a registered user "A" is specified as a user associated with the terminal "ta" based on the association information (FIG. 3). The specified registered user "A" is a user (hereinafter, referred to as an "estimated user") who is estimated to carry the terminal 40 that transmits the identification information, and request the authentication device 10 (vehicle) to perform the authentication process. Information of the estimated user specified by the user specifying unit 15 is transmitted to the authentication processing unit 16.

The authentication processing unit 16 authenticates the user by executing a comparison process for the person specifiable information in a predetermined order of users. The predetermined order of users is an order defined as a default or an order in which the comparison process for the person specifiable information is performed previously. The authentication processing unit 16 retains the predetermined order of users. In the execution of the comparison process, the authentication processing unit 16 changes the order of users in response to the information of the estimated user transmitted from the user specifying unit 15. Specifically, the authentication processing unit 16 performs the comparison process between the input person specifiable information acquired by the person specifiable information acquisition unit 11 and the registered person specifiable information stored in the person specifiable information storage unit 13 in the order prioritizing the estimated user.

With reference to FIG. 4, for example, it is assumed that the estimated user specified in the user specifying unit 15 is a "registered user C" in a situation where the comparison process for registered users A, B, C, is performed in the order of users illustrated in the left part of FIG. 4. In such a case, the authentication processing unit 16 performs the comparison process between the input person specifiable information and the registered person specifiable information by changing the order of users to the order of users illustrated in the right part of FIG. 4 that prioritizes the registered user C. That is, the comparison process between the input person specifiable information and the registered person specifiable information of the registered user C is performed first.

The authentication processing unit 16 authenticates the authentication target user 30 who uses the vehicle, based on the similarity between the input person specifiable information and the registered person specifiable information as a result of the comparison process. More specifically, when an authentication determination value acquired from the similarity between both person specifiable information is higher than or equal to a predetermined threshold that is a reference for authenticating the validity of the user, the authentication processing unit 16 determines that the authentication of the authentication target user 30 as a valid person succeeds, and finishes the comparison process. When the authentication processing unit 16 determines that the authentication does not succeed, the authentication processing unit 16 performs the comparison process for the registered person specifiable information of the subsequent registered user A in the same manner. Accordingly, the authentication processing unit 16 repeats the comparison process between the input person specifiable information and the registered person specifiable information of the user with the subsequent priority until the authentication processing unit 16 determines that the authentication succeeds. When the authentication processing unit 16 determines that the authentication does not succeed for all registered users C, A, B, D, the authentication fails. The authentication result for the authentication target user 30 determined by the authentication processing unit 16 is transmitted to the user specifying unit 15.

All or a part of the person specifiable information acquisition unit 11, the identification information acquisition unit 12, the person specifiable information storage unit 13, the association information storage unit 14, the user specifying unit 15, and the authentication processing unit 16 may be typically configured as an electronic control unit (ECU) that includes a central processing unit (CPU), a memory input and output interfaces, and the like. The electronic control unit can implement the function described above by the CPU reading and executing a predetermined program stored in the memory.

Control Performed by Authentication Device

Figure 5:
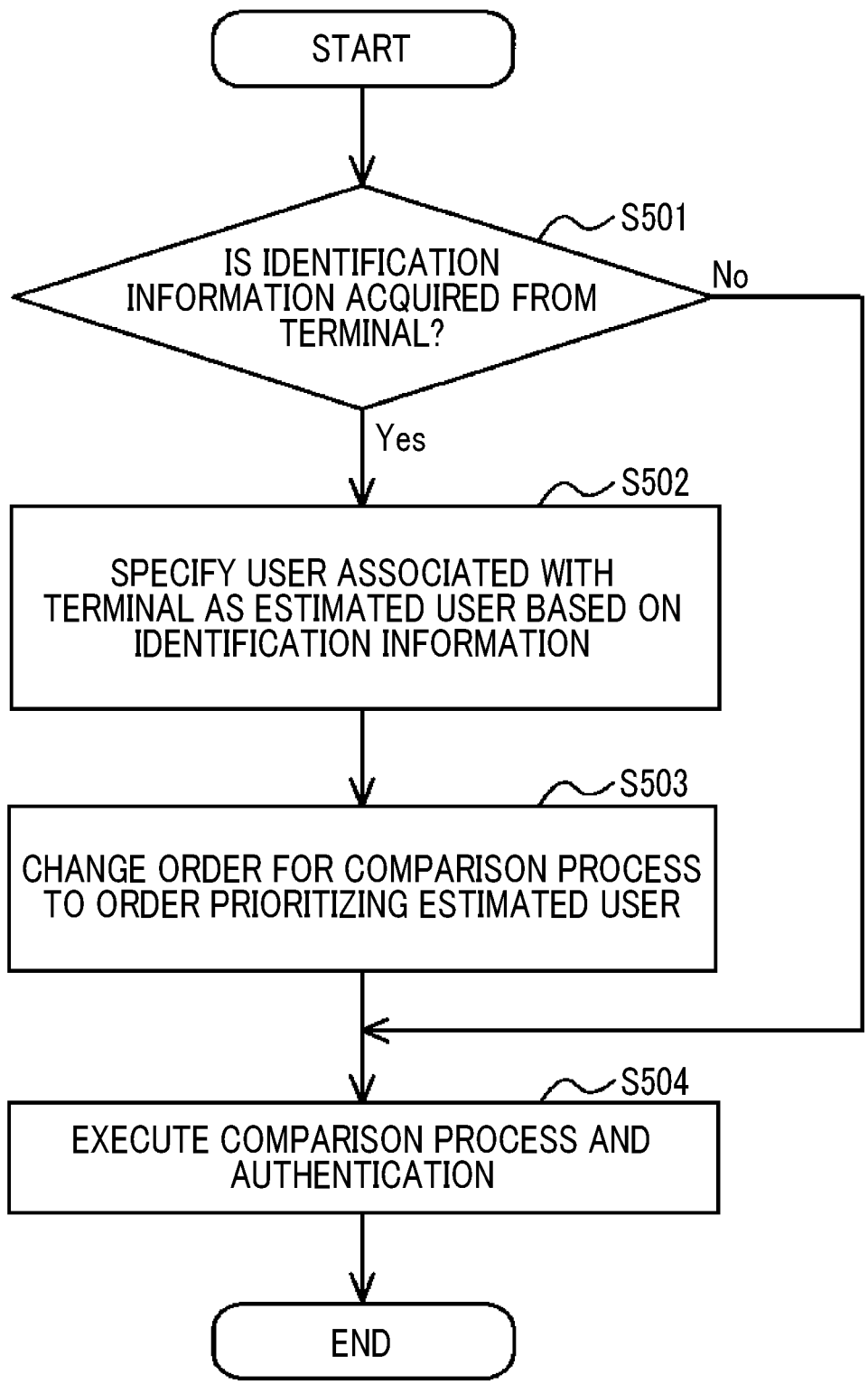
FIG. 5 is a flowchart for describing a procedure of authentication process executed by the authentication device.

An authentication method according to the embodiment of the disclosure will be described. FIG. 5 is a flowchart for describing a procedure of authentication process executed by the authentication device 10 according to the present embodiment. For example, the authentication process is started when the person specifiable information acquisition unit 11 acquires the person specifiable information of the user.

Step S501: In this process, the identification information acquisition unit 12 determines whether or not the identification information transmitted from the terminal is acquired. When the identification information acquisition unit 12 determines that the identification information is acquired (Yes in S501), the process proceeds to step S502. When the identification information acquisition unit 12 determines that the identification information is not acquired (No in S501), the process proceeds to step S504.

Step S502: In this process, the user specifying unit 15 specifies the estimated user who is associated with the terminal transmitting the identification information. When the estimated user associated with the terminal is specified, the process proceeds to step S503.

Step S503: In this process, the authentication processing unit 16 changes the order of users for the comparison process to the order of users that prioritizes the estimated user. When the order of users for the comparison process is changed, the process proceeds to step S504.

Step S504: In this process, the authentication processing unit 16 performs the comparison process and authentication in the defined order of users or the changed order of users for the comparison process. When the authentication of the user either succeeds or fails, the present authentication process is finished.

While the comparison process in the embodiment is executed by changing the order such that the estimated user is prioritized, the disclosure is not limited thereto. The priority of the estimated user in authentication may be increased from that before the change.

Effect of Present Embodiment

As described thus far, in the authentication device 10 and the authentication method executed by the authentication device 10 according to the embodiment of the disclosure, the association information in which the registered user who uses the authentication device 10 is associated with the terminal carried by the registered user is stored in advance in the association information storage unit 14. When there is a need for authenticating the authentication target user 30, and the identification information acquisition unit 12 acquires the identification information that can specify the terminal, the user specifying unit 15 specifies the user associated with the terminal using the identification information and the association information, and the authentication processing unit 16 performs the authentication process in the order of users prioritizing the specified user.

By such a control, the comparison process is always prioritized for the person specifiable information of the user carrying the terminal of which the identification information is acquired, and the probability of the authentication of the authentication target user 30 succeeding in the authentication process performed for the first time is further increased.

Accordingly, the time taken until the authentication of the user succeeds can be further reduced.

All registered users in the person specifiable information stored in the person specifiable information storage unit 13 may match or may not match all registered users in the association information stored in the association information storage unit 14. For example, the person specifiable information of all users having a possibility of using the authentication device 10 (vehicle) may be registered in the person specifiable information storage unit 13, and the association information of a part of users having a relatively high frequency of using the authentication device 10 (vehicle) may be registered in the association information storage unit 14. With such a configuration, all users having a possibility of using the authentication device 10 (vehicle) can be authenticated, and the authentication process can be performed more promptly in a case where a part of users having a relatively high frequency of use uses the authentication device 10 (vehicle).

Modification Example

Figure 6:
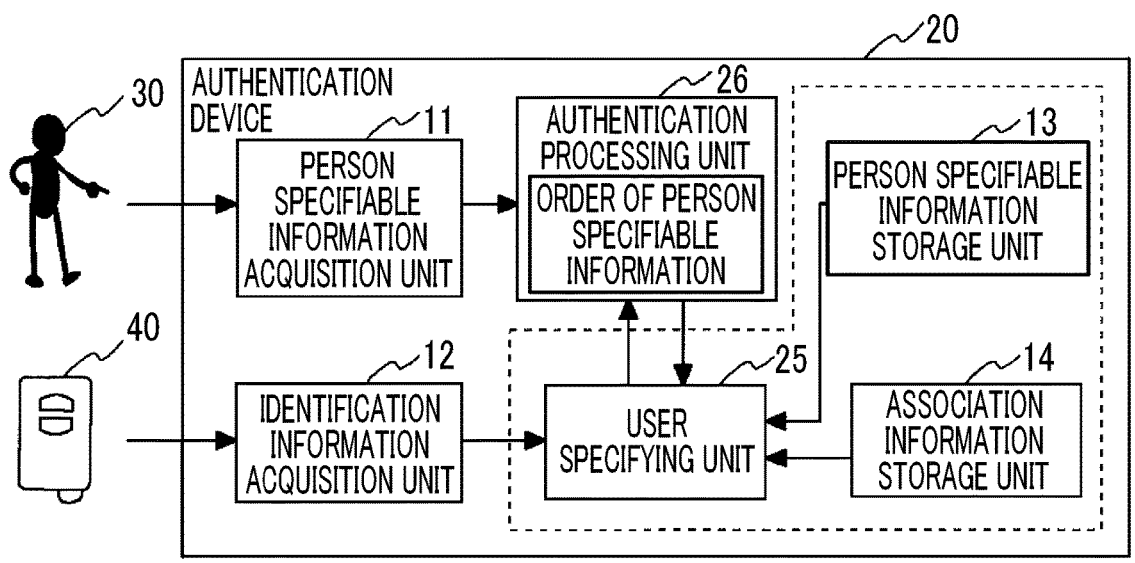
FIG. 6 is a diagram for describing a schematic configuration of an authentication device according to a modification example of the embodiment of the disclosure.

FIG. 6 is a diagram for describing a schematic configuration of an authentication device 20 according to a modification example of the embodiment of the disclosure. The differences between the authentication device 20 according to the modification example and the authentication device 10 are a user specifying unit 25 and an authentication processing unit 26. In the authentication device 20, the authentication processing unit 26 retains the order of person specifiable information as the order for the comparison process, and estimated person specifiable information is transmitted to the authentication processing unit 26 from the user specifying unit 25 instead of the information of the estimated user.

First, the registered user associated with the terminal 40 that transmits the identification information is specified by the user specifying unit 25 based on the association information stored in the association information storage unit 14 and the identification information acquired from the terminal 40 by the identification information acquisition unit 12. Next, the user specifying unit 25 references the person specifiable information storage unit 13, extracts the person specifiable information (hereinafter, referred to as "estimated person specifiable information") of the specified registered user, and transmits the estimated person specifiable information to the authentication processing unit 26.

Figure 7:
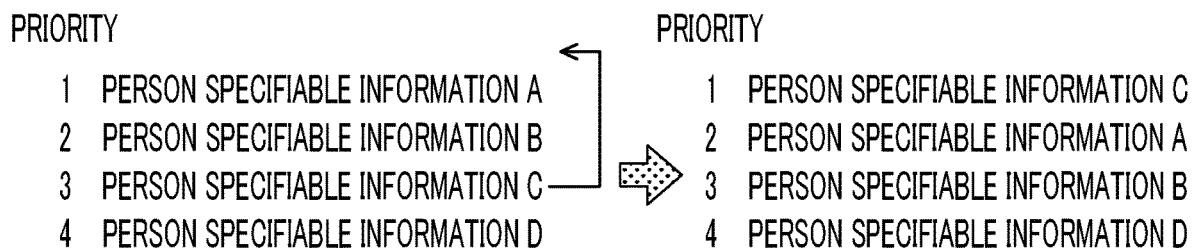
FIG. 7 is a diagram for describing one example of a change in the order of person specifiable information in the comparison process.

The authentication processing unit 26 changes the order of person specifiable information retained in the authentication processing unit 26 to an order that prioritizes the estimated person specifiable information, in response to the estimated person specifiable information transmitted from the user specifying unit 25 (refer to FIG. 7). The authentication processing unit 26 performs the comparison process between the input person specifiable information acquired by the person specifiable information acquisition unit 11 and the registered person specifiable information that is recorded in advance, in the changed order of person specifiable information.

Figure 8:
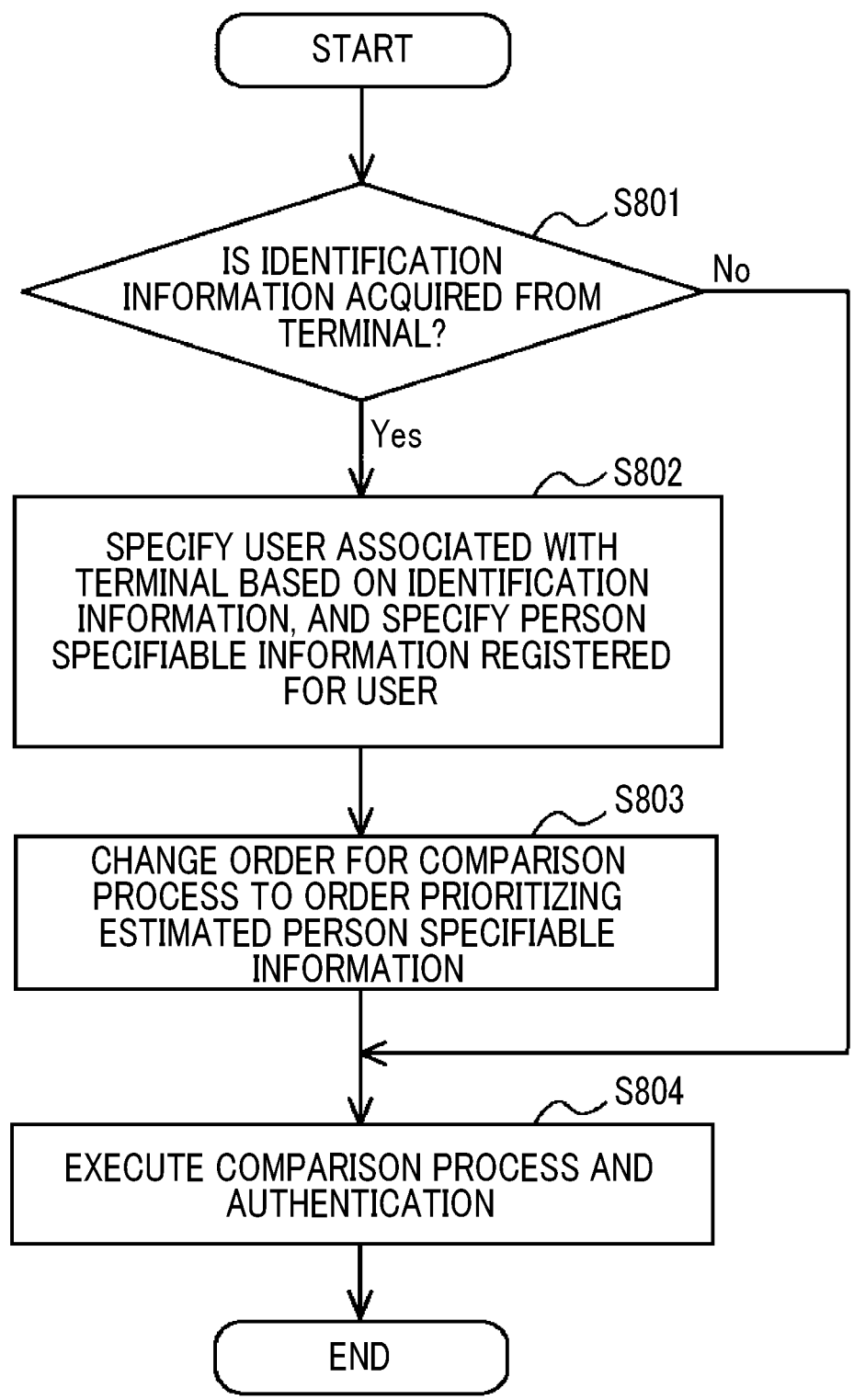
FIG. 8 is a flowchart for describing a procedure of authentication process executed by the authentication device according to the modification example.

FIG. 8 is a flowchart for describing a procedure of authentication process executed by the authentication device 20 according to the modification example. For example, the authentication process is started when the person specifiable information acquisition unit 11 acquires the person specifiable information of the user.

Step S801: In this process, the identification information acquisition unit 12 determines whether or not the identification information transmitted from the terminal is acquired. When the identification information acquisition unit 12 determines that the identification information is acquired (Yes in S801), the process proceeds to step S802. When the identification information acquisition unit 12 determines that the identification information is not acquired (No in S801), the process proceeds to step S804.

Step S802: In this process, the user specifying unit 25 specifies the user who is associated with the terminal transmitting the identification information, and also specifies the person specifiable information registered for the specified user as the estimated person specifiable information. When the estimated person specifiable information is specified from the terminal, the process proceeds to step S803.

Step S803: In this process, the authentication processing unit 26 changes the order of person specifiable information for the comparison process to the order of person specifiable information that prioritizes the estimated person specifiable information. When the order of person specifiable information for the comparison process is changed, the process proceeds to step S804.

Step S804: In this process, the authentication processing unit 26 performs the comparison process and authentication in the defined order of person specifiable information or the changed order of person specifiable information for the comparison process. When the authentication of the user either succeeds or fails, the present authentication process is finished.

The configuration of the modification example enables the person specifiable information storage unit 13 to be configured as a module along with the user specifying unit 25 including the association information storage unit 14 (illustrated by dotted line in FIG. 6). Thus, for example, even when a malfunction occurs on the authentication processing unit 26 side, either loss or unavailability of the person specifiable information associated with the registered user can be suppressed.

Application Example

It is considered that a combination of the user successfully authenticated by the authentication processing unit 16 or 26 and the terminal 40 transmitting the identification information is different from a combination of the registered user and the terminal associated with each other in the association information of the association information storage unit 14.

In such a case, the user specifying unit 15 or 25, or a rewriting unit not illustrated may perform an update by rewriting the association information stored in the association information storage unit 14 with the combination of the user (authentication target user 30) successfully authenticated by the authentication processing unit 16 or 26 and the terminal.

The update may be immediately performed when a different combination is authenticated, may be performed when a different combination is authenticated continuously a predetermined number of times, or may be performed when the cumulative number of times that a different combination is authenticated reaches a predetermined value. Accordingly, for example, even when the user carries a different terminal, such a change can be appropriately dealt with, and the time taken until the authentication of the user succeeds can be further reduced.

In such a case, the user specifying unit 15 or 25 may present the difference between the combination of the user (authentication target user 30) successfully authenticated by the authentication processing unit 16 or 26 and the terminal, and the combination in the association information stored in advance in the association information storage unit 14 to the user through a presentation device (a display, a speaker, or the like) not illustrated. Accordingly, for example, when a certain user accidentally carries the terminal of another user the user can be alerted.

The disclosure can be used for an authentication device and an authentication method for authenticating a user using person specifiable information. The disclosure is particularly useful when it is desirable to further reduce the time that is taken until the authentication of the user succeeds.

What is claimed is:

1. An authentication device that authenticates a user using person specifiable information, the authentication device comprising:
    a first storage unit configured to store person specifiable information for each of a plurality of registered users who are registered in advance;
    a second storage unit configured to store association information in which the plurality of registered users are associated with a predetermined terminal possessed by the plurality of registered users;
    an electronic control unit that is configured to:
        acquire person specifiable information from an authentication target user;
        acquire identification information that is transmitted from a terminal;
        specify a user associated with the terminal transmitting the identification information based on the association information and the identification information;
        set an order of the plurality of registered users based on the user specified; and
        authenticate the authentication target user by executing a comparison process between the person specifiable information of the authentication target user and the person specifiable information for the plurality of registered users stored in the first storage unit in the order set.

2. The authentication device according to claim 1, wherein the electronic control unit is configured to authenticate the authentication target user by executing the comparison process between the person specifiable information of the authentication target user and the person specifiable information for the plurality of registered users stored in the first storage unit in the order set by prioritizing the user specified.

3. The authentication device according to claim 1, wherein the electronic control unit is configured to rewrite the association information when a combination of the authentication target user and the terminal transmitting the identification information is different from a combination of a registered user of the plurality of registered users and the predetermined terminal associated with each other in the association information.

4. The authentication device according to claim 1, wherein the electronic control unit is configured to present a difference in combination to a user through a predetermined presentation device when a combination of the authentication target user and the terminal transmitting the identification information is different from a combination of a registered user of the plurality of registered users and the predetermined terminal associated with each other in the association information.

5. The authentication device according to claim 1, wherein the person specifiable information stored in the first storage unit includes biometric information of at least one of face, fingerprint, iris, vein, voiceprint, retina, or DNA.

6. The authentication device according to claim 1, wherein:
    the authentication device is mounted in a vehicle; and
    the predetermined terminal is a portable device that is used for operating the vehicle.

7. The authentication device according to claim 1, wherein:
    person specifiable information of a user having a possibility of using the authentication device is registered in the first storage unit; and
    association information of a part of users having a predetermined frequency of using the authentication device is registered in the second storage unit.

8. An authentication method executed by an authentication device that authenticates a user using person specifiable information, the authentication device including an electronic control unit that includes a storage unit configured to store person specifiable information for each of a plurality of registered users who are registered in advance and association information in which the plurality of registered users are associated with a predetermined terminal possessed by the plurality of registered users, the authentication method comprising:
    by the electronic control unit using the person specifiable information for the plurality of registered users and the association information stored in the storage unit,
    acquiring person specifiable information from an authentication target user;
    acquiring identification information that is transmitted from a terminal;
    specifying a user associated with the terminal transmitting the identification information based on the association information and the identification information;
    setting an order of the plurality of registered users based on the user specified; and
    authenticating the authentication target user by executing a comparison process between the person specifiable information of the authentication target user and the person specifiable information for the plurality of registered users stored in the storage unit in the order set.

9. A non-transitory storage medium for an authentication device that authenticates a user using person specifiable information, the authentication device including an electronic control unit that includes a storage unit configured to store person specifiable information for each of a plurality of registered users who are registered in advance and association information in which the plurality of registered users are associated with a predetermined terminal possessed by the plurality of registered users, the non-transitory storage medium including control logic executable by a computer processor so that the electronic control unit using the person specifiable information for the plurality of registered users and the association information stored in the storage unit:
    acquires person specifiable information from an authentication target user;
    acquires identification information that is transmitted from a terminal;
    specifies a user associated with the terminal transmitting the identification information based on the association information and the identification information;
    sets an order of the plurality of registered users based on the user specified; and
    authenticates the authentication target user by executing a comparison process between the person specifiable information of the authentication target user and the person specifiable information for the plurality of registered users stored in the storage unit in the order set.

\* \* \* \* \*